J. W. VANDIVER
Corn Planter.

No. 22,208.

Patented Nov. 30, 1858.

UNITED STATES PATENT OFFICE.

JNO. W. VANDIVER, OF SHELBYVILLE, MISSOURI.

IMPROVEMENT IN SEEDING-MACHINES.

Specification forming part of Letters Patent No. 22,208, dated November 30, 1858.

*To all whom it may concern:*

Be it known that I, JOHN W. VANDIVER, of Shelbyville, in the county of Shelby and State of Missouri, have invented a new and Improved Seeding-Machine; and I do hereby declare that the following is a full, clear, and exact description of the same, reference being had to the annexed drawings, making a part of this specification, in which—

Figure 2:
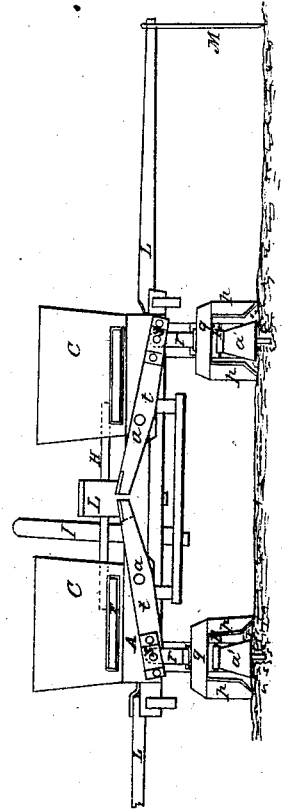
Figure 1:
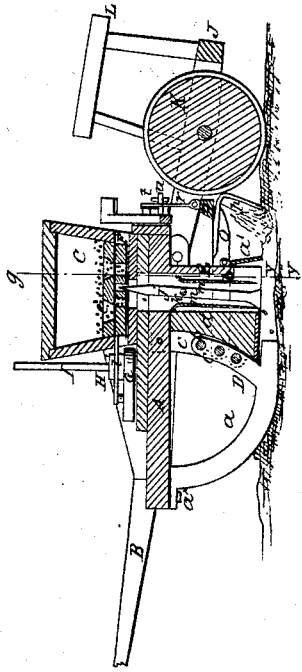
Figure 3:
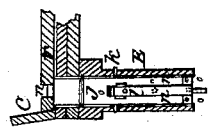
Figure 3:
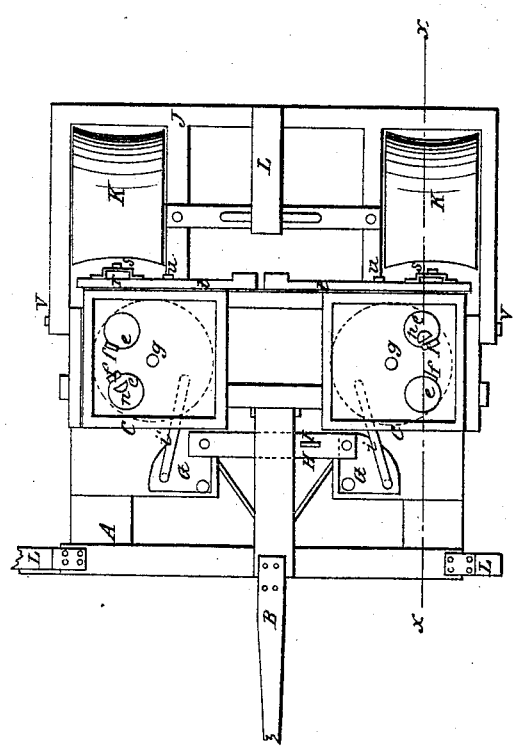

Figure 1 is a side sectional view of my invention, taken in the line $x\ x$ of Fig. 2. Fig. 2 is a back view of the same, the roller-frame being removed. Fig. 3 is a plan or top view of the same. Fig. 4 is a detached sectional view of one of the seed-tubes, the valve being shown within it. $y\ y$, Fig. 1, indicate the line of section.

Similar letters of reference indicate corresponding parts in the several figures.

This invention consists in a peculiar seed-scattering device placed within the seed-conveying tubes, and arranged as hereinafter fully shown and described, whereby the seed may be scattered in the hill as it is dropped, so that the seed of each dropping will be planted in the hills at suitable distances apart most favorable for its perfect growth and cultivation.

To enable those skilled in the art to fully understand and construct my invention, I will proceed to describe it.

A, Fig. 1, represents a horizontal frame, to the front end of which a draft-pole, B, is attached. On the frame A, and at each side, a seed-box, C, is placed, and to the under side of the frame, at each side, a share, D, is attached, said share supporting the frame A and forming the furrows to receive the seed. The shares D are formed in sections, the front parts, $a$, being attached to the frame by bolts $b$, which pass through pendent bars $c$, attached to the frame, and through a bar, $c'$, attached to the parts $a$. The back parts, $d$, of the shares are made of flaring form, and are attached permanently to the frame A, while the back parts of the front parts, $a$, may be raised and lowered to a certain extent, in consequence of the attachment to the frame by the bolts $b$ passing through the bars $c\ c'$, the latter having a series of holes made in them, through either of which the bolts may pass, the front screw, $a^*$, being relaxed as circumstances may require. To the back ends of the flaring parts $d$ of the shares tubes E are attached, one to each. These tubes extend up through the top of the frame A and underneath the seed-boxes C C. The bottom of each seed-box has two openings, $e\ e$, made in it, the sides of which are beveled or rounded, and each opening is provided at a certain point with a strip of leather or india-rubber, $f$, the lower edges of the leather or rubber extending down to a plate, F. The plates F are of circular form, and work each on a pivot or axis, $g$. Each plate F has two holes, $h\ h$, made in it at equal distances from its center, and each plate F is connected by a rod, $i$, with a lever-block, G, said blocks being pivoted on the frame A, one in front of each seed-box. To the lever-blocks G G a bar, H, is attached, through which an upright lever, I, passes.

In each tube E an upright bar or rod, $j$, is pivoted, as shown at $k$. The upper ends of these bars or rods are fitted in the plates F, between the holes $h\ h$. To each side of the bars or rods $j$ an elastic plate, $l$, is attached, as shown in Figs. 1 and 3. These elastic plates are attached to the bars or rods $j$ by means of arms $m$, which allow a certain space between the bars or rods and the plates, and the plates are somewhat narrower than the bars or rods $j$, so that a space, $n$, is allowed on each side of them, as shown clearly in Fig. 3. The upper ends of the elastic plates $l$ are slightly bent or curved outward, as shown in Fig. 1.

To each side of the shares D a bar, $o$, is attached by a pivot, $n'$, and to the back end of each bar $o$ a covering-share, $p$, is attached. The back ends of the bars $o$ are connected by a transverse bar, $q$, to each side of which a vertical bar, $r$, is attached, the upper ends of said bars being attached by pivots $s$ to levers $t\ t$, which are pivoted to the back part of the frame A, as shown at $u\ u$, Fig. 2.

To the back part of the frame A a frame, J, is attached by pivots or bolts $v$. This frame J is mounted on rollers K K, the peripheries of which are of concave form. The rollers are placed directly in line with the seed-tubes E, and on the frame between the two rollers the driver's seat is placed.

To the back part and lower end of each seed-tube E a flap, $a'$, is attached, as shown clearly in Figs. 1 and 2, and to the front part of the frame A, at each side, a bar, L, is attached by a hinge or joint, each bar having a rod, M, attached to serve as a marker, said rods being allowed to turn on pivots, so that they may turn down out of the way when the bars L are turned over on the machine.

The operation of the machine is as follows: As the device is drawn along an attendant on the front part of the frame A operates the lever I back and forth, and said lever I actuates the slide H, which, through the medium of the lever-block G G, and rods $i\ i$, gives a vibrating motion to the plates F F, and the seed is distributed from the seed-boxes C C through the holes $e\ h$ into the tubes E. As the seed comes down the tubes E a portion of each dropping passes each side of the elastic plates $l$ and falls directly into the furrows made by the shares D D, and another portion passes down between the plates $l$ and the rods $j$, and, as the rods $j$ are attached at their upper ends to the plates F, they will also be vibrated, and the seed that passes down between the rods $j$ and the plates $l\ l$ will be discharged at opposite sides of the tubes, and the seed of each dropping scattered in the hills, the furrows being made sufficiently wide in order to insure such result in consequence of the flaring back part, $d$, of the shares D making the furrows sufficiently wide. The scattering of the seed in the hills is very important, as each stalk has sufficient room to expand and grow properly, the roots being kept comparatively free from its fellows in the same hill. The furrows may be made of greater or less depth by adjusting the parts $a$ of the shares higher or lower, as may be desired. The shares $p$ cover the seed, and the roller K compresses the earth on the same in rounded form. The flaps $a'$ prevent any obstructions, such as weeds or other substances, to pass out from the lower ends of the tubes E.

I do not claim the seed-distributing device formed of the perforations $e$ in the bottoms of the seed-boxes, in connection with the perforated vibrating plates F; nor do I claim the bars L, hinged to the frame A, with markers M attached, to serve as guides for keeping the rows parallel and at equal distances apart; neither do I claim the rollers K K with concave peripheries, nor the covering-shares $p$, for the above parts have all been previously used; but,

Having thus described my invention, what I claim as new, and desire to secure by Letters Patent, is—

The bars or rods $j$, pivoted within the said conveying-tubes E, and having elastic plates $l\ l$ attached, the upper ends of said bars or rods being connected with the vibrating plates F of the seed-distributing device, substantially as and for the purpose set forth.

JOHN W. VANDIVER.

Witnesses:
JOHN R. CALVERT,
JOHN S. COOPER.